(12) United States Patent
Meisiek et al.

(10) Patent No.: US 10,006,561 B2
(45) Date of Patent: Jun. 26, 2018

(54) ELECTROMAGNET OF AN ELECTROMAGNETICALLY ACTUATED FLUID VALVE

(71) Applicant: Robert Bosch GmbH, Stuttgart (DE)

(72) Inventors: Achim Meisiek, Rudersberg (DE); Stefan Kolb, Gaertringen (DE)

(73) Assignee: Robert Bosch GmbH, Stuttgart (DE)

( * ) Notice: Subject to any disclaimer, the term of this patent is extended or adjusted under 35 U.S.C. 154(b) by 95 days.

(21) Appl. No.: 15/103,251

(22) PCT Filed: Dec. 2, 2014

(86) PCT No.: PCT/EP2014/076215
§ 371 (c)(1),
(2) Date: Jun. 9, 2016

(87) PCT Pub. No.: WO2015/086372
PCT Pub. Date: Jun. 18, 2015

(65) Prior Publication Data
US 2016/0305571 A1    Oct. 20, 2016

(30) Foreign Application Priority Data

Dec. 10, 2013   (DE) .................. 10 2013 225 392

(51) Int. Cl.
*F16K 31/06*  (2006.01)
*F16K 47/00*  (2006.01)
(Continued)

(52) U.S. Cl.
CPC ...... *F16K 31/0693* (2013.01); *F16K 31/0644* (2013.01); *F16K 31/0686* (2013.01); *H01F 7/088* (2013.01); *H01F 7/16* (2013.01)

(58) Field of Classification Search
CPC ............. F16K 31/0686; F16K 31/0689; F16K 31/0696; F16K 47/00; H01F 7/088
See application file for complete search history.

(56) References Cited

U.S. PATENT DOCUMENTS 2,750,962 A * 6/1956 Kreitchman ........ F16K 31/0648
137/625.48
3,168,242 A * 2/1965 Diener ............... G05D 23/1906
236/75
(Continued)

FOREIGN PATENT DOCUMENTS

DE    102012204922    10/2012
DE    102011052526    2/2013
(Continued)

OTHER PUBLICATIONS

International Search Report for Application No. PCT/EP2014/076215 dated Mar. 12, 2015 (English Translation, 3 pages).

*Primary Examiner* — Seth W Mackay-Smith
(74) *Attorney, Agent, or Firm* — Michael Best & Friedrich LLP

(57) ABSTRACT

An electromagnet of an electromagnetically actuated fluid valve includes a magnet core that receives a coil, and an armature unit that can be moved axially relative to the coil in the magnet core. The electromagnet further has a device for damping a stop of the armature unit against the magnet core. The device has a flow cross-section for a medium, the flow cross-section decreasing when the armature unit is moved. The cross-section can be formed by a cone that interacts with a counter surface.

4 Claims, 3 Drawing Sheets

(51) Int. Cl.
*H01F 7/08* (2006.01)
*H01F 7/16* (2006.01)

(56) References Cited

U.S. PATENT DOCUMENTS

| | | | |
|---|---|---|---|
| 3,612,479 A | 10/1971 | Smith | |
| 3,805,204 A * | 4/1974 | Petersen | H01F 7/13 335/255 |
| 4,240,266 A * | 12/1980 | Scrine | F16K 39/022 251/282 |
| 4,250,922 A * | 2/1981 | Will | F16K 31/0613 137/116.3 |
| 4,278,959 A * | 7/1981 | Nishimiya | H01F 7/1607 335/251 |
| 4,442,998 A * | 4/1984 | Ohyama | F16K 11/044 137/625.5 |
| 4,522,372 A * | 6/1985 | Yano | F16K 31/0675 251/129.02 |
| 4,845,451 A * | 7/1989 | Uetsuhara | H01F 7/088 335/257 |
| 4,855,702 A * | 8/1989 | Swanson | H01F 7/1607 335/261 |
| 5,546,064 A * | 8/1996 | Sallam | H01F 7/1607 335/249 |
| 6,615,780 B1 * | 9/2003 | Lin | F01L 1/34 123/90.11 |
| 2003/0098074 A1 | 5/2003 | Kayahara et al. | |
| 2004/0155212 A1 * | 8/2004 | Hess | F01P 7/14 251/64 |
| 2004/0159811 A1 * | 8/2004 | Ueda | F16K 7/20 251/129.15 |
| 2007/0158603 A1 * | 7/2007 | Vollmer | F16K 31/0655 251/50 |
| 2009/0101858 A1 | 4/2009 | Pechtold | |
| 2011/0315251 A1 * | 12/2011 | Rampen | F16K 31/0696 137/561 R |
| 2012/0012767 A1 * | 1/2012 | Leiser | F16K 31/0648 251/129.01 |

FOREIGN PATENT DOCUMENTS

| | | |
|---|---|---|
| EP | 1878957 | 1/2008 |
| GB | 290373 | 5/1928 |
| GB | 759178 | 10/1956 |

* cited by examiner

ELECTROMAGNET OF AN ELECTROMAGNETICALLY ACTUATED FLUID VALVE

BACKGROUND OF THE INVENTION

The invention relates to an electromagnet of an electromagnetically actuated fluid valve, the electromagnet having a magnet core which receives a coil and an armature unit which can be moved axially with respect to the coil in the magnet core, and, furthermore, having a device for damping a stop of the armature unit on the magnet core.

An electromagnet of this type of an electromagnetically actuated fluid valve is known from DE 10 2011 052 526 A1. Said fluid valve which is actuated by the electromagnet is an inlet valve for the fuel to be fed to a pump working space of a high pressure fuel pump. The fuel which is fed to the pump working space is delivered by a pump piston via a high pressure outlet and a forwarding high pressure line into a high pressure accumulator, from which the fuel which is stored there is removed by fuel injectors for injection into associated combustion chambers of an internal combustion engine. The electromagnet has a magnet core which receives a coil and an armature unit with an armature which is arranged on an armature bolt and can be moved axially with respect to the coil in the magnet core. In order to damp the stop or contact of the armature of the armature unit on the magnet core, an elastomeric ring which serves as a stop buffer is arranged on the armature unit on the end side. Said elastomeric ring is susceptible to wear, however, and accordingly the stop damping of the armature unit which is brought about by the elastomeric ring can decrease or fail.

SUMMARY OF THE INVENTION

The invention is based on the object of providing an electromagnet which is improved permanently with regard to the noise emanating from it.

Said object is achieved by virtue of the fact that the device has a throughflow cross section for a medium, which throughflow cross section is reduced in the case of a movement of the armature unit. The damping of the impact movement of the armature unit, in particular of an armature of the armature unit, on the magnet core is therefore no longer carried out by way of a deforming elastomeric element, but rather is brought about by way of hydraulic or pneumatic damping of the armature unit during the impact movement. A hydraulic or pneumatic damping device operates completely without wear, with the result that there is no impairment of the service life of the electromagnet by way of said damping device.

In one development of the invention, the device is a cone which interacts with a corresponding surface. Here, a flow cross section is formed between the cone and the corresponding surface, which flow cross section is reduced, in particular, during the end stage of the movement of the armature unit just before the contact of the armature unit on the magnet core, and therefore brings about the damping action. The configuration as a cone additionally has the advantage that the flow cross-sectional area is increased as a result in comparison with a planar configuration of the device.

In one development of the invention, the cone is let into or formed in the armature unit, in particular the armature. This configuration has the further advantage that the mass of the armature unit to be moved is reduced as a result, as a result of which firstly the magnetic force for moving the armature unit is reduced and secondly the damping of the movement of the armature unit is simplified. Even if the cone is preferably let into the armature unit, it can also as an alternative be let into the magnet core within the scope of the invention. This can be advantageous, for example, depending on structural conditions.

In one development of the invention, the cone interacts with the corresponding surface in the magnet core of the armature unit. As a result, no separate component is required, on which the corresponding surface is arranged; in addition, the component would have to be fastened to the electromagnet in a suitable way.

In a further refinement of the invention, the cone surrounds a pot-shaped recess. Here, the magnet core or the armature has a cylinder projection which can be introduced into the pot-shaped recess. This refinement produces a flow pinching gap between the pot-shaped recess and the cylinder projection, through which gap medium has to flow into the recess during an introduction movement of the cylinder projection. This operation likewise brings about a further damping action, it being possible, moreover, for the pinching gap to be configured in such a way that a pressure cushion is formed in the recess, which pressure cushion likewise damps the introduction movement of the cylinder projection. Here, the medium flows out of a pressure cushion space along the throughflow cross section into the pot-shaped recess which is connected via a flow connection to a lower armature space which lies underneath and increases in size.

In one development of the invention, an end stop of the armature in the magnet core is formed by a residual air gap disk which is arranged in the region of the cone and/or of the pot-shaped recess. Here, the movement which is performed by the armature unit between end positions which lie opposite one another can be set by way of a corresponding selection of the residual air gap disk.

In a further refinement of the invention, the electromagnet is part of an upstroke valve for a high pressure fuel pump. In principle, the electromagnet can be installed with the fluid valve in any desired device, the preferred application taking place, however, in a high pressure fuel pump for an internal combustion engine. Here, the fuel is let into a pump working space of the high pressure fuel pump by means of the fluid valve which is actuated by the electromagnet. In addition to the wear reduction as a result of the suppressed impact of the armature unit on the magnet core, a reduction in noise is also achieved, in particular, by virtue of the fact that the movement of the armature unit is damped. Finally, as a result, an increase in the accuracy of the fuel metering can also be achieved, since rebounding of the armature unit from the magnet core and renewed opening of the fluid valve which is caused as a result are ruled out by way of the damping action. Otherwise, the medium which flows through the throughflow cross section can be a gaseous medium, in particular air, or else a fluid, in particular fuel. For example, in the case of a liquid-tight seal of the electromagnet with respect to the fluid valve, the electromagnet can be filled with air, whereas, in the case of an electromagnet which is not sealed with respect to the fluid valve, said electromagnet is filled with fuel. Here, in this refinement, the fuel can be used both as a damping fluid and as a lubricating fluid for the moving parts of the electromagnet.

Further advantageous refinements of the invention can be gathered from the description of the drawing, in which one exemplary embodiment which is shown in the figures is described in greater detail.

DETAILED DESCRIPTION

Figure 1:
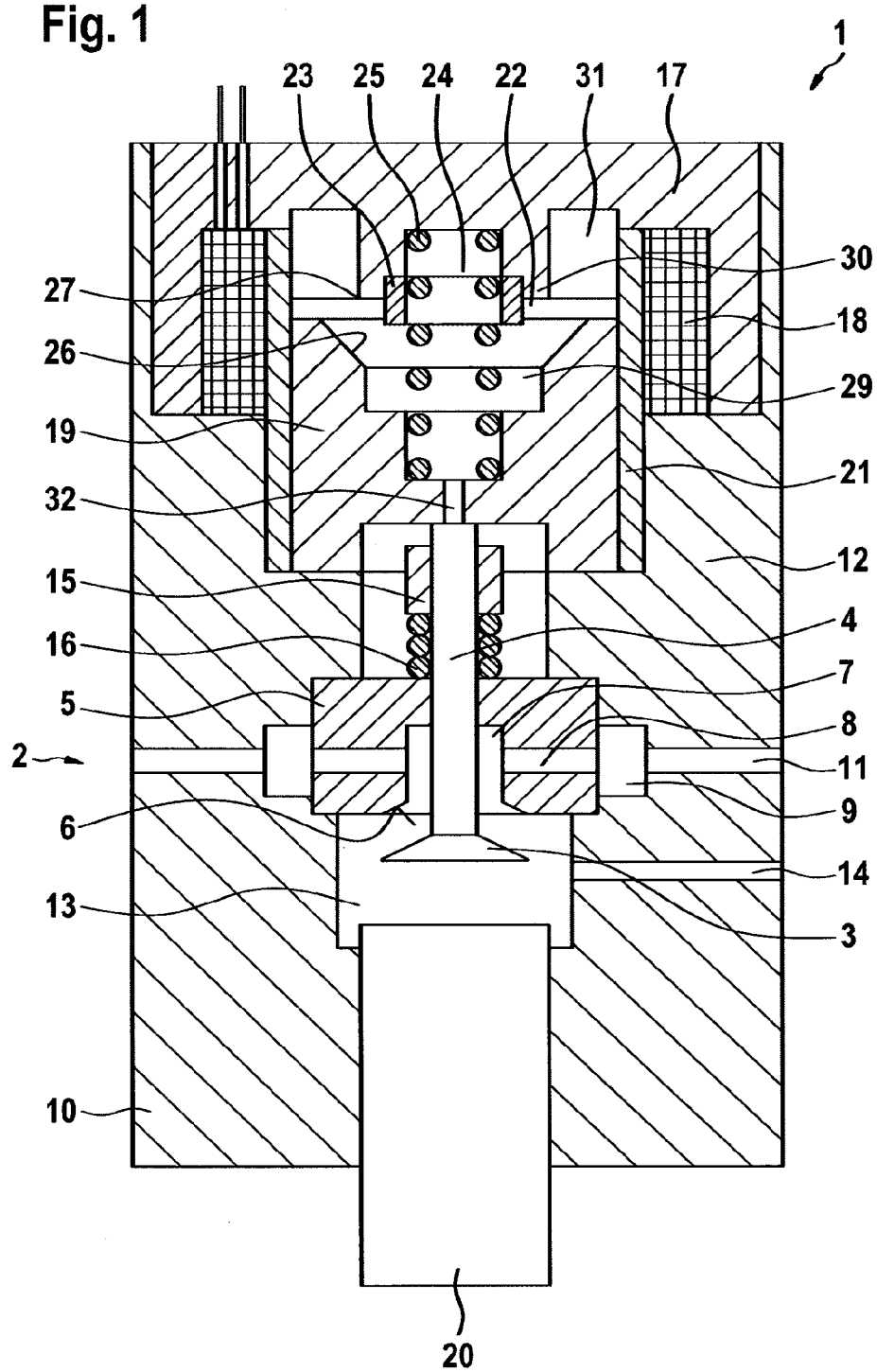
FIG. 1 shows a diagrammatic longitudinal section through an electromagnet which is configured according to the invention and actuates a fluid valve, the electromagnet having moved the fluid valve into an open position.

FIG. 1 shows an electromagnet 1 which interacts with a fluid valve 2, FIG. 1 reproducing the open position of the fluid valve 2. The fluid valve 2 has a valve piston 4 which supports a valve head 3, the valve piston 4 being guided in a valve cylinder 5 with simultaneous formation of a valve seat 6 for the valve head 3. The valve seat 6 is adjoined by a valve space 7 which is connected via bores 8 to a surrounding annular space 9 in a housing. For its part, the annular space 9 is connected via an access bore 11 to the further fuel system. The housing is installed, for example, into the pump cylinder head 12 of a high pressure fuel pump for a fuel injection system, or else the housing is the pump cylinder head 12 itself. A pump working space 13 of the high pressure fuel pump is let into the pump cylinder head 12, which pump working space 13, in the open position of the fluid valve 2 which is shown, is filled with fuel via the access bore 11, the annular space 9, the bores 8 and the valve space 7.

This filling operation takes place during a downward movement of a pump piston 20 which can be moved below the pump working space 13 in a cylinder bore of a pump cylinder 10 of the high pressure fuel pump, which pump cylinder 10 is preferably configured in one piece with the pump cylinder head 12. Said pump piston 20 is moved up and down periodically by a camshaft or eccentric shaft of the high pressure fuel pump, the pump piston 20 delivering, in the case of an upward movement and a fluid valve 2 which then shuts off the pump working space 13 from the valve space 7 (see also FIG. 3), fuel which is situated in the pump working space 13 via a high pressure outlet 14 with an inserted check valve into a forwarding high pressure line which is connected to a high pressure accumulator of the fuel injection system. The fuel which is stored there at a pressure of up to 3000 bar can be removed from the high pressure accumulator by fuel injectors for injection into associated combustion chambers of the internal combustion engine. The fuel is fed to the access bore 11 by a low pressure fuel system as a constituent part of the fuel injection system or from a tank, for example.

Lying opposite the valve head 3, a spring collar 15 is fastened to the valve piston 4, between which spring collar 15 and the valve cylinder 5 a valve spring 16 is clamped. The valve spring 16 has a low spring stiffness and presses the spring head 3 (regardless of other forces which act) into contact with the valve seat 6. The electromagnet 1 which has a coil 18 which is arranged in a magnet housing 17 is arranged above the valve piston 4. The magnet housing 17 is inserted into a cylinder recess in the valve housing 10. Furthermore, the electromagnet 1 has an armature unit 19 which consists of at least one armature which is shown in the figure. However, it can also be provided that the armature unit 19 additionally has an armature bolt which supports the armature. Here, the armature bolt (instead of the armature unit 19) can then be mounted in the magnet housing 17 in a suitable way. The armature unit 19 is guided longitudinally displaceably in a guide which is arranged in the magnet housing 17. However, the armature bolt can also be installed without a dedicated guide, and the armature can be guided in the magnet housing 17 by way of a sleeve 21 which surrounds the armature and is made from a magnetically insulating material. Furthermore, at least one upper residual air gap disk 23 is installed in an armature space 22 which receives the armature 19, which upper residual air gap disk 23 is likewise produced from a magnetically insulating material and limits the upwardly oriented axial movement of the armature unit 19 and therefore, in particular, of the armature.

The armature (or, if present, the armature bolt) of the armature unit 19 and the valve piston 4 have contact surfaces which are configured in a planar manner with respect to one another and via which an opening movement which is exerted by the electromagnet 1 via the armature unit 19 is transferred to the valve piston 4. A compression spring 25 with a high spring stiffness is arranged in the armature space 22 and a compression spring space 24 which is arranged above it, which compression spring 25, in the non-energized state of the coil 18, presses the armature unit 19 onto the valve piston 4 and therefore, overcoming the spring force of the valve spring 16, the valve piston 3 in the direction of the pump working space 13 in order to set the open position of the valve head 3.

Figure 2:
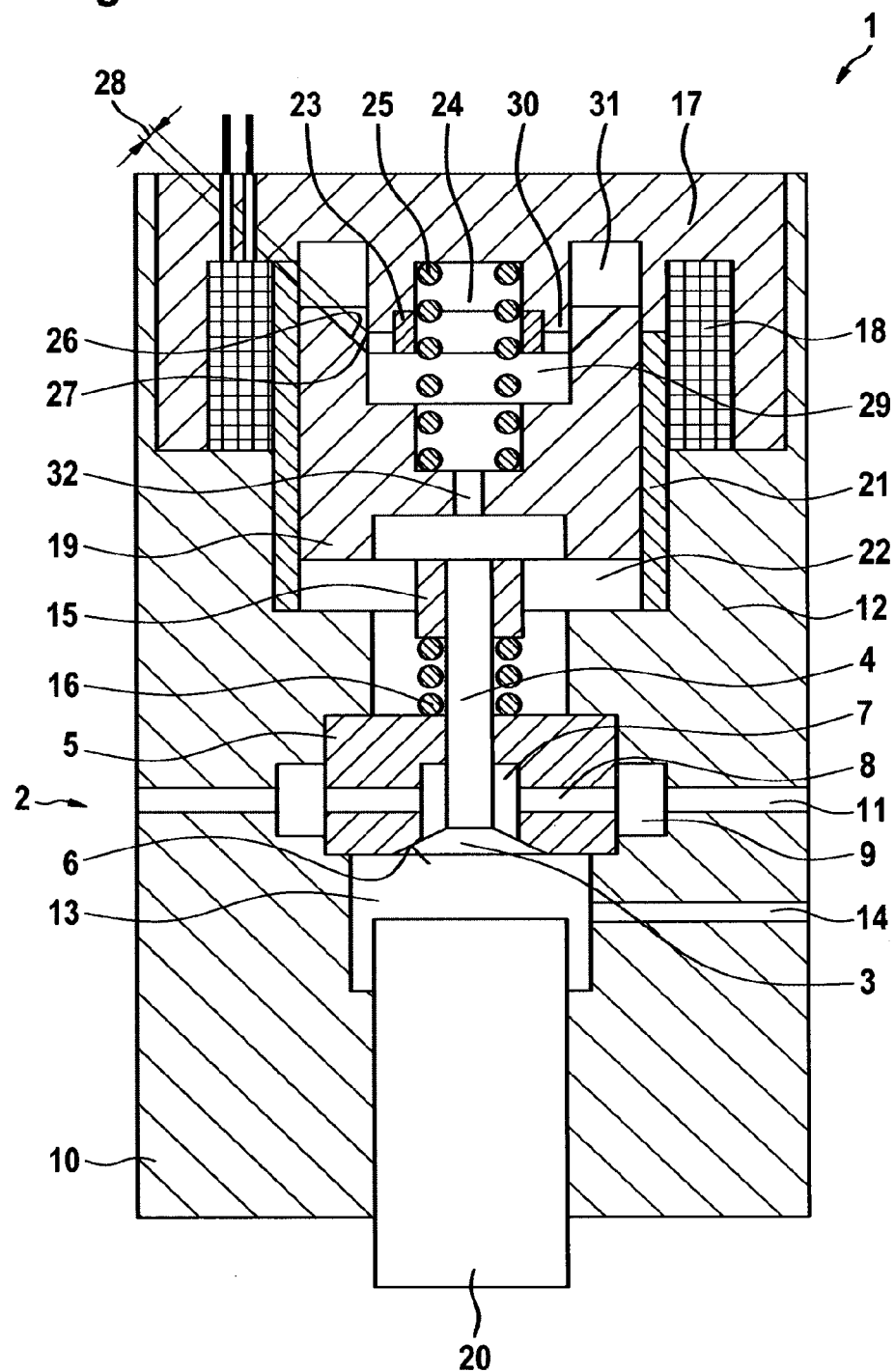
FIG. 2 shows a similar diagrammatic longitudinal section as in FIG. 1, an armature unit of an electromagnet having assumed the position just before impact on a magnet core of the electromagnet.
Figure 3:
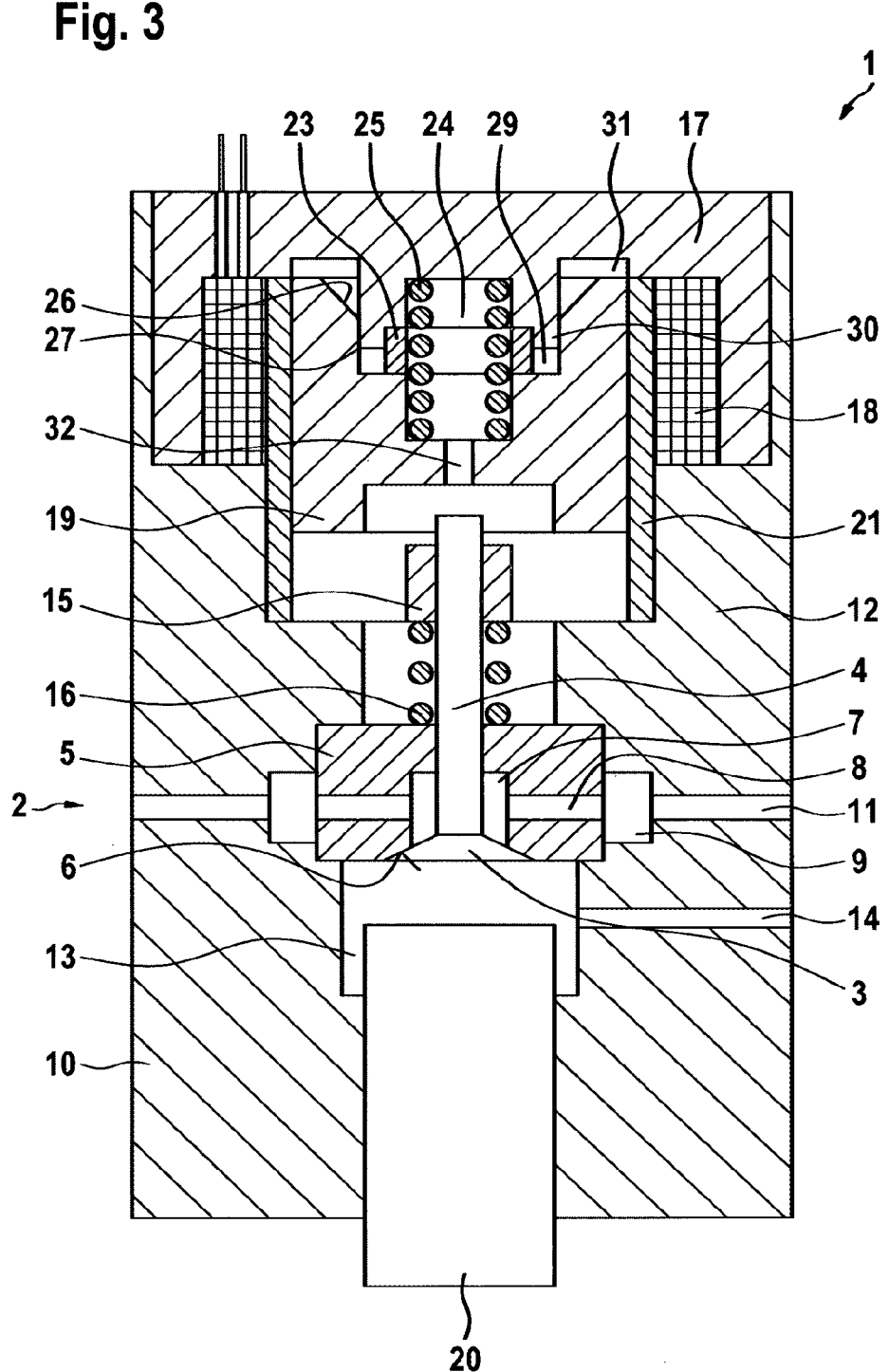
FIG. 3 shows a diagrammatic longitudinal section through an electromagnet and a fluid valve in a closed position of the fluid valve, in which an armature unit of the electromagnet bears against a magnet core or a residual air gap disk.

In the energized state of the coil 18, an electromagnetic field is generated on the circumference of the coil 18, which electromagnetic field moves the armature unit 19 (as shown in FIGS. 2 and 3) upward until in contact with the upper residual air gap disk 23a. As a result, the valve spring 16 can move the spring collar 15 and therefore the valve piston 4 and the valve head 3 upward until the valve head 3 bears against the valve seat 6 as shown in FIGS. 2 and 3.

In order to achieve a damping action of the stop of the armature unit 19 on the magnet core 17, a cone 26 is machined into the armature 19, which cone 26 interacts with a corresponding surface 27 (see also FIG. 2) on the magnet core 17 before the armature 19 comes into contact with the magnet core 17 or the residual air gap disk 23. As a result, the throughflow cross section 28 which is shown in FIG. 2 is formed, which brings about a damping action of the stop movement of the armature 19. For the case where the electromagnet 1 is separated in a liquid-tight manner from the fluid valve 2, air can be situated in the electromagnet 1 and, as a consequence, air flows through the throughflow cross section 28. For the case where the fluid valve 2 is not sealed with respect to the electromagnet 1, the armature space 22 is filled with fuel, for example, and fuel flows through the throughflow cross section 28 in order to damp the stop movement. Here, the air or the fuel flows out of the pressure cushion space 31 along the throughflow cross section 28 into the pot-shaped recess 29 which is connected via a flow connection 32 to the lower armature space 22 which lies below it and increases in size.

Furthermore, the cone 26 surrounds a pot-shaped recess 29 which is likewise let into the armature unit 19. A cylinder projection 30 which is arranged on the magnet core 17 (as shown in FIG. 3) can be introduced into the pot-shaped recess 29, which cylinder projection 30 likewise brings about a damping action of the stop movement of the armature 19, by the flow connection 32 by the throughflow cross section and the upper armature space 22 being shut off.

The invention claimed is:

1. An electromagnet (1) of an electromagnetically actuated fluid valve (2), the electromagnet (1) comprising: a magnet core (17) which receives a coil (18); an armature unit (19) which can be moved axially with respect to the coil (18) in the magnet core (17); and a device for damping a stop movement of the armature unit (19) on the magnet core (17), characterized in that the device has a throughflow cross section (28) for a medium, which throughflow cross section is reduced in the case of a movement of the armature unit (19) and wherein the throughflow cross section is defined by a cone (26) formed in the armature unit (19) and a corresponding surface (27) on the magnet core (17), and wherein
  the armature unit (19) includes a pot-shaped recess (29) formed therein and axially offset from the cone (26) such that no portion of the cone (26) extends into the pot-shaped recess (29), and the magnet core (17) has a cylinder projection (30) having a diameter corresponding to a diameter of the pot-shaped recess (29), and wherein when the cylinder projection 30 is introduced into the pot-shaped recess (29) upon energization of the coil (18), flow through the throughflow cross section is prevented.

2. The electromagnet (1) as claimed in claim 1, characterized in that an end stop of the armature unit (19) in the magnet core (17) is formed by a residual air gap disk (23) which is arranged in a region of the cone (26), or of the pot-shaped recess (29), or both.

3. The electromagnet (1) as claimed in claim 1, characterized in that the medium is a gaseous medium or a liquid.

4. The electromagnet (1) as claimed in claim 1, characterized in that the electromagnet (1) and the fluid valve (2) are part of an electromagnetically actuated upstroke valve for a high pressure fuel pump.

\* \* \* \* \*